(12) United States Patent
Kim et al.

(10) Patent No.: US 10,168,251 B2
(45) Date of Patent: *Jan. 1, 2019

(54) UNIVERSAL BUCK FOR SLED TEST

(71) Applicant: Hyundai Motor Company, Seoul (KR)

(72) Inventors: Hee Seok Kim, Gyeonggi-Do (KR); Jong Pil Yoon, Incheon (KR)

(73) Assignee: Hyundai Motor Company, Seoul (KR)

( * ) Notice: Subject to any disclaimer, the term of this patent is extended or adjusted under 35 U.S.C. 154(b) by 253 days.

This patent is subject to a terminal disclaimer.

(21) Appl. No.: 15/187,567

(22) Filed: Jun. 20, 2016

(65) Prior Publication Data

US 2017/0131181 A1    May 11, 2017

(30) Foreign Application Priority Data

Nov. 9, 2015 (KR) .................. 10-2015-0157012

(51) Int. Cl.
*G01M 17/007* (2006.01)

(52) U.S. Cl.
CPC .............................. *G01M 17/0078* (2013.01)

(58) Field of Classification Search
CPC ............... G01M 17/00; G01M 17/007; G01M 17/0078; G01N 3/20; G01N 3/307; G01N 3/317

USPC .......... 73/12.01, 12.04, 12.06, 12.07, 865.3, 73/865.6, 866.4

See application file for complete search history.

(56) References Cited

U.S. PATENT DOCUMENTS

| 7,836,749 B2 | 11/2010 | Chen et al. | |
| 2008/0121014 A1* | 5/2008 | Chen ................. | G01M 17/0078 73/12.01 |
| 2017/0131182 A1* | 5/2017 | Kim ................. | G01M 17/0078 |

FOREIGN PATENT DOCUMENTS

| CN | 202119612 U | 1/2012 |
| CN | 203881540 U | 10/2014 |
| KR | 10-2003-0004591 A | 1/2003 |
| KR | 2008-0025947 A | 3/2008 |
| KR | 2008-0026817 A | 3/2008 |
| KR | 2013-0079468 A | 7/2013 |

* cited by examiner

*Primary Examiner* — Robert R Raevis
(74) *Attorney, Agent, or Firm* — Mintz Levin Cohn Ferris Glovsky and Popeo, P.C.; Peter F. Corless

(57) ABSTRACT

A universal buck for a sled test is provided. The buck includes a support plate, and a plurality of pillars that are mounted on the support plate. Additionally, a roof is mounted on at least some of the plurality of pillars and a wind shield is mounted between pillars disposed on a front side among the plurality of pillars and a front end of the roof. The plurality of pillars, the roof, and the wind shield are mounted to be adjustable in position on the support plate.

27 Claims, 8 Drawing Sheets

UNIVERSAL BUCK FOR SLED TEST

CROSS-REFERENCE TO RELATED APPLICATION

This application is based on and claims the benefit of priority to Korean Patent Application No. 10-2015-0157012, filed on Nov. 9, 2015, in the Korean Intellectual Property Office, the disclosure of which is incorporated herein in its entirety by reference.

TECHNICAL FIELD

The present disclosure relates to a universal buck for a sled test, and more particularly, to a universal buck for a sled test that can be extensively utilized even at a stage of advanced engineering of vehicles.

BACKGROUND

A sled test may be performed prior to a real vehicle crash test for improving crash performance of vehicles, and optimization and dummy behavior characteristics of restraint devices (e.g., a seat belt, a seat, an airbag, etc.) may be analyzed using such a sled test. The sled test is performed after a buck is installed in sled equipment. The buck is a structure having only an occupant compartment remaining as other parts are removed from a body in white (BIW). In particular, various components fitting a corresponding vehicle are installed in the buck to replicate a real vehicle environment.

To perform a sled test, a BIW for producing a buck is required, but an advanced engineered vehicle does not have a BIW yet, and thus, there is no buck. Thus, in many cases, a sled test is not capable of being performed and an advanced engineered vehicle may rely on an interpretation or a sled test is omitted in an advanced engineering stage. Additionally, even in case of a vehicle with a frame, a degree of replication of various parts installed in the buck is insufficient and thus optimization of restraint devices and passenger behavior characteristics based on a sled test are not effectively analyzed.

SUMMARY

The present disclosure provides a universal buck for a sled test, allowing a plurality of components mounted thereon to be more easily adjusted in position to realize a general-purpose structure fitting various types of vehicles, thus being effectively utilized for a crash improvement sled test even in an advanced engineering stage of a vehicle.

According to an exemplary embodiment of the present disclosure, a universal buck for a sled test may include: a support plate; a plurality of pillars mounted on the support plate; a roof mounted on at least some of the plurality of pillars; and a wind shield mounted between pillars disposed on a front side among the plurality of pillars and a front end of the roof, wherein the plurality of pillars, the roof, and the wind shield may be mounted to be adjustable in position on the support plate.

The support plate may include a plurality of support units disposed to be symmetrical on both left and right sides thereof. The plurality of support units may individually slidably support the plurality of pillars, and the plurality of pillars may be mounted to be adjustable in position on the plurality of support units, respectively. Additionally, the plurality of support units may each include a pair of support bars spaced apart from each other in a width direction of the support plate and a linear bearing disposed between the pair of support bars. The pair of support bars may each include a plurality of mounting apertures spaced apart from each other at a predetermined interval, and the plurality of pillars may be mounted to be adjustable in position on the pair of support bars through the plurality of mounting apertures.

A plurality of rolling members may be arranged to be spaced apart from each other at a predetermined interval on a surface of the linear bearing. The plurality of pillars may include: a pair of first pillars installed on a front side of the support plate and disposed to be symmetrical laterally; a pair of second pillars spaced apart from the pair of first pillars backwardly and disposed to be symmetrical laterally; and a pair of third pillars spaced apart from the pair of second pillars backwardly and disposed to be symmetrical laterally. The universal buck may further include: a pair of extending members that extend in a length direction of the support plate across upper ends of the pair of second pillars and upper ends of the pair of third pillars, wherein the pair of extending members may be disposed to be symmetrical laterally.

The roof may be mounted on the pair of extending members, the pair of extending members may have a plurality of mounting apertures spaced apart from each other at a predetermined interval thereon, and the roof may be mounted to be adjustable in position through the plurality of mounting apertures of the pair of extending members. A door may be mounted to be adjustable in position between the plurality of pillars. The universal buck may further include: a knee bolster panel mounted to be adjustable in position below the wind shield. The knee bolster panel may be mounted to be adjustable in a tilt angle thereof by a pair of adjustment blocks and a pair of adjustment arms respectively connected to the pair of adjustment blocks.

The pair of adjustment blocks may be respectively connected to the pair of first pillars disposed below the wind shield, an upper end of the knee bolster panel may be pivotably mounted at a first end of each of the pair of adjustment blocks, and an upper end of each of the pair of adjustment arms may be mounted to be adjustable in position in a length direction of the pair of adjustment blocks, and a lower end of each of the pair of adjustment arms may be mounted to be adjustable in position in a length direction of the knee bolster panel. The pair of adjustment blocks may each have a plurality of mounting apertures spaced apart from each other at a predetermined interval, and the knee bolster panel may have a plurality of mounting apertures spaced apart from each other at a predetermined interval on opposing sides thereof.

According to another exemplary embodiment of the present disclosure, a universal buck for a sled test may include: a support plate; a plurality of pillars mounted to be adjustable in position on the support plate; a roof mounted to be adjustable in position on at least some of the plurality of pillars; a wind shield mounted to be adjustable in position between pillars disposed on a front side among the plurality of pillars and a front end of the roof; and a cowl cross mounted to be adjustable in position below the wind shield.

The cowl cross may include a first cross member and a second cross member mounted to be spaced apart from the first cross member, and the first cross member may be extendible and contractible in length. The first cross member may include a main pipe and a pair of auxiliary pipes movable from both ends of the main pipe in a length direction. A pair of connection blocks may be respectively connected to the pair of auxiliary pipes, and the pair of connection blocks may be mounted to be adjustable in position respectively by a pair of adjustment members, whereby both ends of the first cross member may be independently adjusted in position.

The pair of adjustment members may each have a plurality of mounting apertures be spaced apart from each other at a predetermined interval, and the pair of connection blocks may be mounted to be adjustable in position on the pair of adjustment members through the plurality of mounting apertures of the pair of adjustment members. Both end portions of the second cross member may be connected to the pair of adjustment members, a pair of mounting plates may be respectively coupled to the pair of adjustment members, and the pair of mounting plates may have a plurality of mounting apertures having a pattern structure, and both ends of the second cross member may be mounted to be adjustable in position on the pair of mounting plates through the plurality of mounting apertures of the pair of mounting plates, respectively.

A first coupling block to which an upper mounting portion of a steering column is coupled may be mounted to be adjustable in position on the first cross member, and a second coupling block to which a lower mounting portion of the steering column is coupled may be mounted to be adjustable in position on the second cross member. The cowl cross may include a first cross member and a second cross member mounted to be spaced apart from the first cross member, and the first cross member and the second cross member may be extendible and contractible in length. The first cross member may include a first main pipe and a pair of first auxiliary pipes movable from both ends of the first main pipe in a length direction.

A pair of first connection blocks may be respectively connected to the pair of first auxiliary pipes, and the pair of first connection blocks may be respectively mounted to be adjustable in position by a pair of first adjustment members, whereby both ends of the first cross member may be independently adjusted in position. The pair of first adjustment members may include a plurality of mounting apertures spaced apart from each other at a predetermined interval, and the pair of first connection blocks may be mounted to be adjustable in position on the pair of first adjustment members through the plurality of mounting apertures of the pair of first adjustment members.

The second cross member may include a second main pipe and a pair of second auxiliary pipes movable from both ends of the second main pipe in a length direction. A pair of second connection blocks may be respectively connected to the pair of second auxiliary pipes, and the pair of second connection blocks may be respectively mounted to be adjustable in position by a pair of second adjustment members, whereby both ends of the second cross member may be independently adjusted in position. The pair of second adjustment members may include a plurality of mounting apertures spaced apart from each other at a predetermined interval, and the pair of second connection blocks may be mounted to be adjustable in position on the pair of second adjustment members through the plurality of mounting apertures of the pair of second adjustment members.

A coupling plate to which the upper mounting portion and the lower mounting portion of the steering column are coupled may be mounted to be adjustable in position on the first cross member and the second cross member, and the coupling plate may be mounted across the first cross member and the second cross member. The coupling plate may include a first coupler to which the upper mounting portion of the steering column is coupled and a second coupler to which the lower mounting portion of the steering column is coupled. The first coupler may include a pair of slots disposed or formed on a first portion of the coupling plate and a pair of first mounting blocks mounted to be respectively adjusted in position in the pair of slots, and the pair of first mounting blocks may each have a mounting aperture in which the upper mounting portion of the steering column may be mounted.

Particularly, a fastening aperture may be disposed to be adjacent to the pair of slots, and a stopper configured to prevent movement of the pair of first mounting blocks may be coupled to the fastening aperture. The second coupler may have a pair of second mounting protrusions disposed on a second portion of the coupling plate, and a mounting aperture allowing the lower mounting portion of the steering column to be mounted thereon may be disposed on each of the pair of second mounting protrusions.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
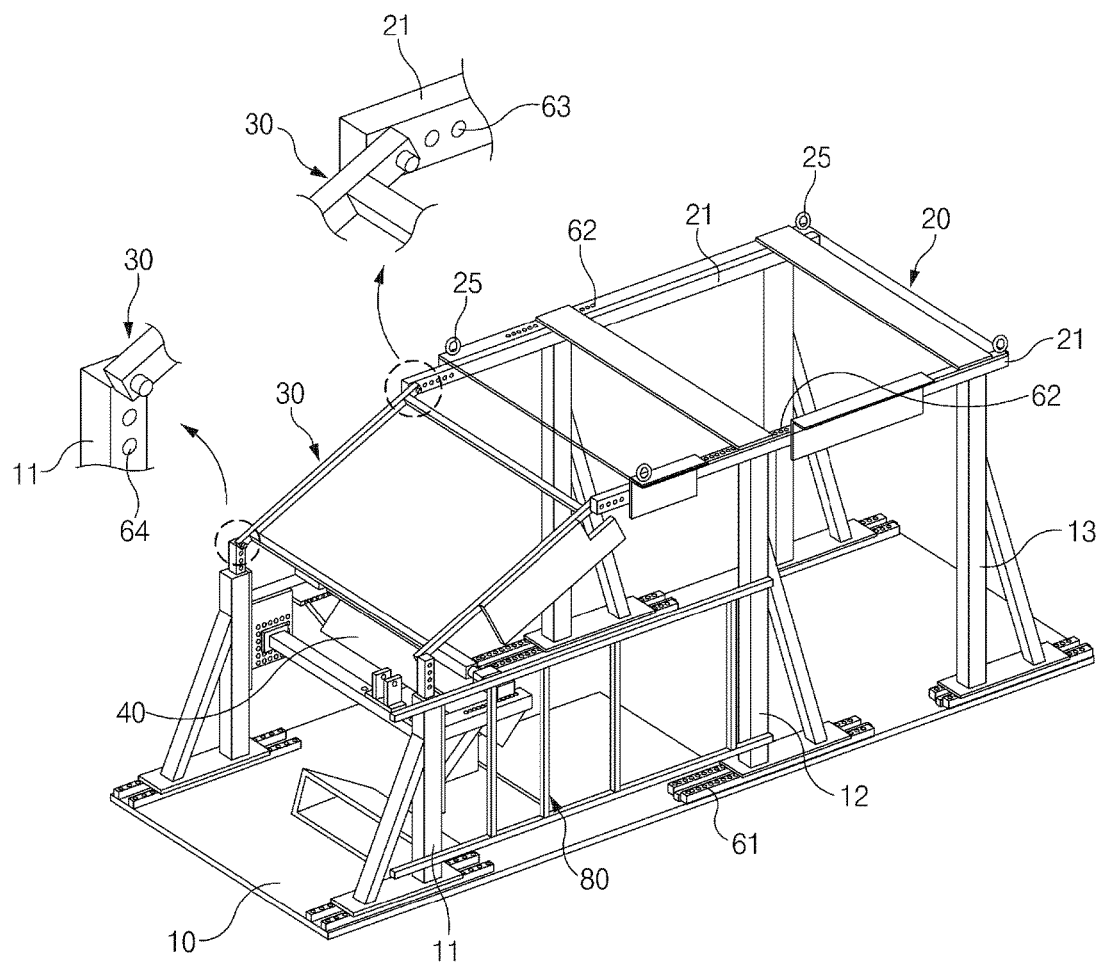
FIG. 1 is a perspective view illustrating a universal buck for a sled test according to various exemplary embodiments of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiment of the present disclosure will be described in detail with reference to the accompanying drawings. For reference, dimensions of elements or thicknesses of lines illustrated in the drawings referred to describe the present disclosure may be exaggerated for the convenience of understanding. Also, the terms used henceforth have been defined in consideration of the functions of the present disclosure, and may be altered according to the intent of a user or operator, or conventional practice. Therefore, the terms should be defined based on the entire content of this specification.

Figure 2:
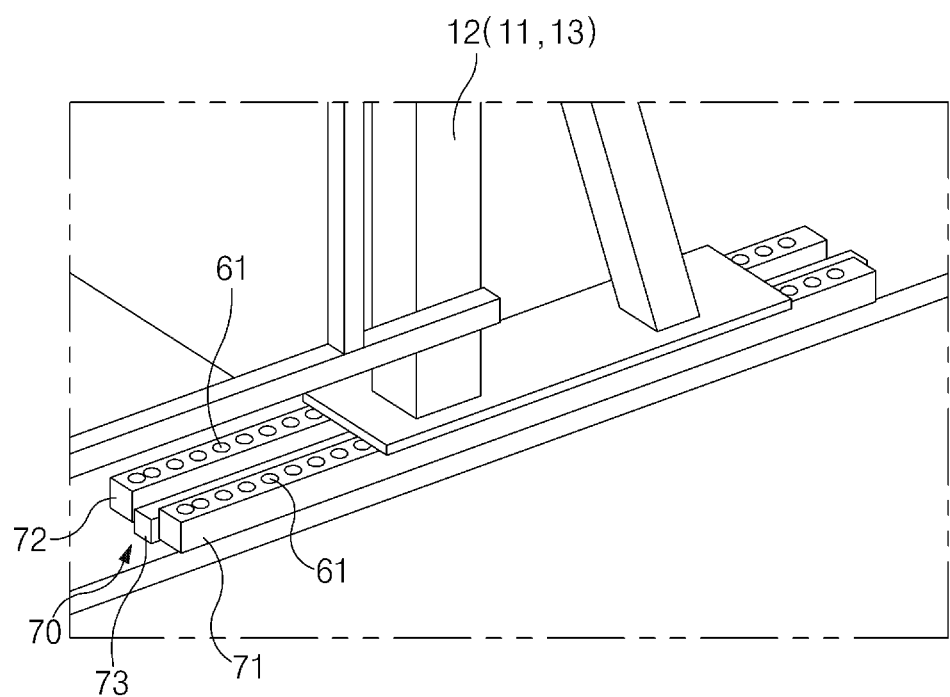
FIG. 2 is an enlarged view of a portion "A" of FIG. 1 according to an exemplary embodiment of the present disclosure.

FIGS. 1 through 4 illustrate a universal buck for a sled test according to various exemplary embodiments of the present disclosure. Referring to FIGS. 1 and 2, a universal buck for a sled test according to an exemplary embodiment of the present disclosure may include a support plate 10, a plurality of pillars 11, 12, and 13 mounted on the support plate 10, a roof 20 mounted on at least some of the plurality of pillars 11, 12, and 13, and a wind shield 30 installed to be sloped between pillars disposed on a front side, among the plurality of pillars 11, 12, and 13, and a front end of the roof 20.

The support plate 10 may include a plurality of support units 70 disposed to be symmetrical on both left and right sides thereof. Each of the support units 70 may include a pair of support bars 71 and 72 spaced apart from each other in a width direction of the support plate 10 and a linear bearing 73 disposed between the support bars 71 and 72. A plurality of mounting apertures 61 may be spaced apart from each other at a predetermined interval in each of the support bars 71 and 72. The linear bearing 73 may have a structure in which rolling members such as balls or rollers are arranged to be spaced apart from each other at a predetermined interval on a surface thereof.

The plurality of pillars 11, 12, and 13 may include a pair of first pillars 11 installed on a front portion of the support plate 10, a pair of second pillars 12 spaced apart from the first pillars 11 backwardly, and a pair of third pillars 13 spaced apart from the second pillars 12 backwardly. The first pillars 11, copying (e.g., replicating) A-pillars of an actual vehicle, may be disposed to be symmetrical left and right on the support plate 10. The second pillars 12, copying B-pillars of an actual vehicle, may be disposed to be symmetrical left and right on the support plate 10. The third pillars 13, copying C-pillars of an actual vehicle, may be disposed to be symmetrical left and right on the support plate 10. The support unit 70 may be provided in plurality corresponding to the number of the plurality of pillars 11, 12, and 13. The plurality of support units 70 may be configured to individually slidably support the pillars 11, 12, and 13, respectively.

As illustrated in FIG. 2, after each of the plurality of pillars 11, 12, and 13 is installed on the pair of support bars 71 and 72 of the support unit 70, each of the plurality of pillars 11, 12, and 13 may be configured to slide along the linear bearing 73. Thus, by the sliding movement on the support bars 71 and 72 along the linear bearing 73, each of the plurality of pillars 11, 12, and 13 may be individually adjusted in position in a forward/backward direction thereof, and, in this state, mounting apertures disposed or formed on lower ends of each of the plurality of pillars 11, 12, and 13 may be aligned with the mounting apertures 61 and fasteners may be fastened thereto, whereby each of the plurality of pillars 11, 12, and 13 may be mounted to be adjusted in position on the pair of support bars 71 and 72 of the support unit 70.

The roof 20, a component replicating a roof panel of a real vehicle, may be installed on the top of the pair of the second pillars 12 and the pair of third pillars 13. A plurality of loops 25 may be disposed on the top of the roof 20, and a hoist may be connected to the loops 25 to facilitate movement or installation of the roof 20. The roof 20 may be mounted on top of a pair of extending members 21 to adjust the position of the roof 20. The pair of extending members 21 may be disposed to be symmetrical bilaterally. A left extending member 21 may extend across an upper end of the second pillar 12 and an upper end of the third pillar 13 positioned on the left, and a right extending member 21 may extend across an upper end of the second pillar 12 and an upper end of the third pillar positioned on the right.

The extending members 21 may each have a plurality of mounting apertures 62 spaced apart from each other at a predetermined interval, and the roof 20 may be mounted to be adjusted in position in a forward/backward direction by selectively fastening a fastener to the plurality of mounting apertures 62. The wind shield 30 may be mounted between front end portions of the extending members 21 and the first pillars 11 to adjust a tilt angle thereof. Mounting apertures 63 may be spaced apart from each other by a predetermined interval in the front end portions of the extending members 21, and mounting apertures 64 may be spaced apart from each other in upper ends of the first pillars 11.

Thus, since an upper end of the wind shield 30 may be mounted to be adjustable in position in a forward/backward direction through the mounting apertures 63 of the extending members 21 and a lower end of the wind shield 30 may be mounted to be adjustable in position in vertical direction through the mounting apertures 64 of the first pillars 11, a tilt angle of the wind shield 30 may be adjusted. Further, a door 80 may be mounted to be adjustable in position between the plurality of pillars 11, 12, and 13. As illustrated in FIG. 1, the door 80 may also be installed between the first pillars 11 and the second pillars 12.

Figure 3:
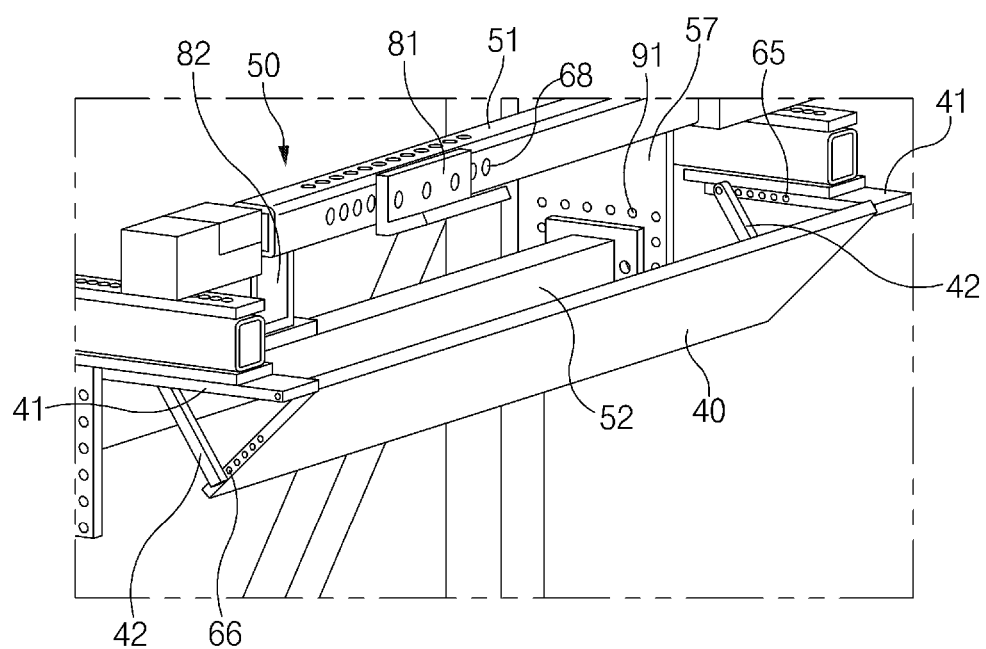
FIG. 3 is an enlarged view of a portion "B" of FIG. 1 according to an exemplary embodiment of the present disclosure.

As illustrated in FIG. 3, a knee bolster panel 40 replicating a knee bolster of a real vehicle may be mounted to be adjustable in position below the wind shield 30. The knee bolster panel 40 may be mounted to be adjustable in a tilt angle thereof by a pair of adjustment blocks 41 and a pair of adjustment arms 42 respectively connected to the pair of adjustment blocks 41. The pair of adjustment blocks 41 may be individually connected to the pair of first pillars 11 disposed below the wind shield 30 to be disposed to be symmetrical at both left and right sides on the support plate 10. Each of the adjustment blocks 41 may have an extended bar structure, a plurality of mounting apertures 65 may be spaced apart from each other at a predetermined interval on each of the adjustment blocks 41, and an upper end of the knee bolster panel 40 may be pivotably mounted on a first end of each of the adjustment blocks 41.

An upper end of each of the adjustment arms 42 may be mounted to be adjustable in position in a length direction of the adjustment block 41 through the plurality of mounting apertures 65. A plurality of mounting apertures 66 may be spaced apart from each other at a predetermined interval on opposing surfaces of the knee bolster panel 40, and a lower end of each of the adjustment arms 42 may be mounted to be adjustable in position in a length direction of the knee bolster panel 40 through the plurality of mounting apertures 66. Accordingly, since the position of the upper end of the adjustment arm 42 may be adjusted in the length direction of the adjustment block 41 and the position of the lower end of the adjustment arm 42 may be adjusted in the length direction of the knee bolster panel 40, a tilt angle of the knee bolster panel 40 may be adjusted more easily.

Figure 4:
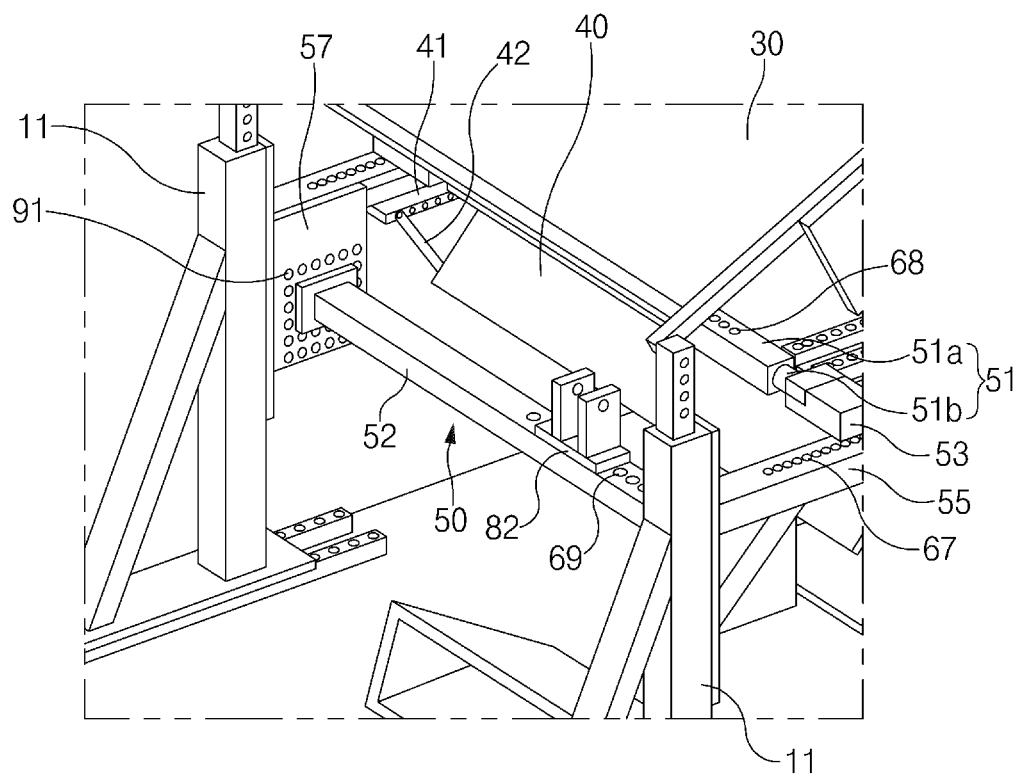
FIG. 4 is an enlarged view of a portion "C" of FIG. 1, illustrating a cowl cross assembly according to various exemplary embodiments of the present disclosure.
Figure 5:
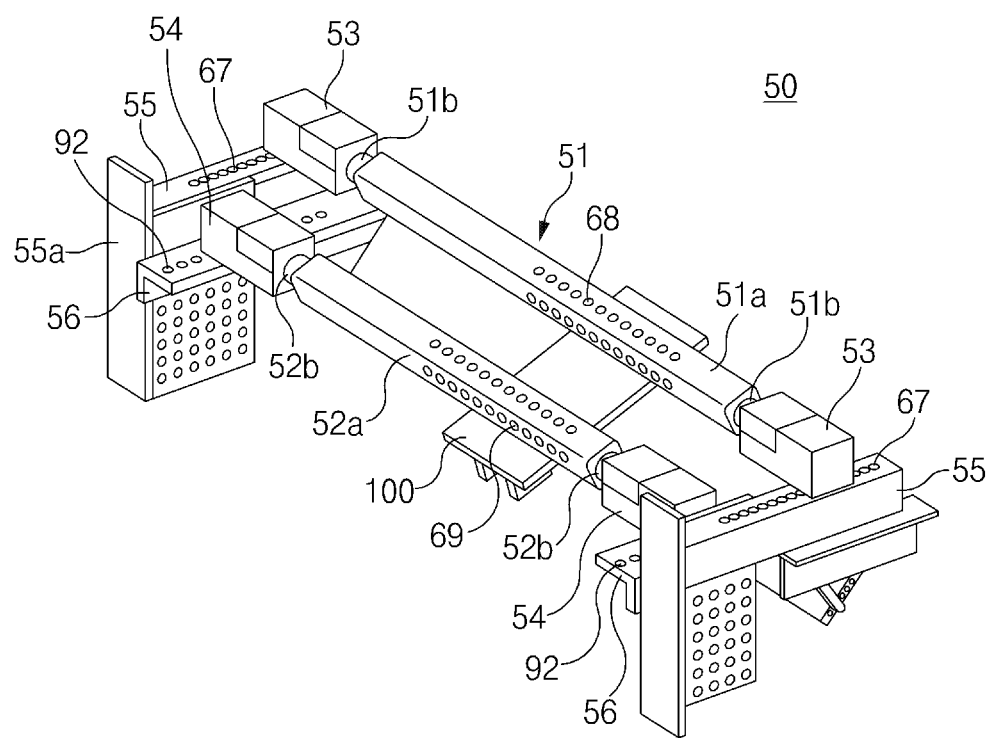
FIG. 5 is a perspective view illustrating a cowl cross assembly according to another exemplary embodiment of the present disclosure regarding FIG. 4.

As illustrated in FIG. 4, a cowl cross 50 replicating a cowl cross assembly of a real vehicle may be mounted to be adjustable in position below the wind shield 30 adjacent to the first pillar 11. According to an exemplary embodiment, the cowl cross 50 may include a first cross member 51 and a second cross member 52 spaced apart from the first cross member 51. The first cross member 51 may be configured to be extendible and contractible in length. Accordingly, the first cross member 51 may have a main pipe 51*a* and a pair of auxiliary pipes 51*b* movable from both ends of main pipe 51*a* in a length direction. Since the auxiliary pipes 51*b* may be moved individually to be led or guided into or led out of both ends of the main pipe 51*a*, the first cross member 51 may be extendible and contractible in length.

A connection block 53 may be individually connected to each of the auxiliary pipes 51*b*, and thus, a pair of connection blocks 53 may be provided at both ends of the first cross member 51. The position of the pair of connection blocks 53 may be independently adjusted by a pair of adjustment members 55, and the pair of adjustment members 55 may be symmetrically disposed on both left and right sides of the cowl cross 50. Accordingly, since the position of the pair of connection blocks 53 may be individually adjusted by the pair of adjustment members 55, the both left and right ends of the first cross member 51 may be mounted to be adjusted in position individually. In particular, since the first cross member 51 may be extendible and contractible in length, the position of both ends of the first cross member 51 may be more flexibly adjusted independently.

A plurality of mounting apertures 67 may be spaced apart from each other at a predetermined interval on each of the adjustment members 55, and the connection block 53 may be mounted to be adjustable in position on the adjustment member 55 through the plurality of mounting apertures 67. Accordingly, since the position of both ends of the first cross member 51 may be adjusted independently, the first cross member 51 may be adjusted to be sloped when viewed from above.

A connector 55*a* may be disposed on one side of each of the adjustment members 55. The connector 55*a* may be coupled to the first pillar 11 through welding, or the like, and the adjustment member 41 of the knee bolster panel 40 may be coupled to the adjustment member 55 of the cowl cross 50 through welding, or the like. Thus, since the connector 55*a* may be welded to the first pillar 11, the adjustment member 55 of the cowl cross 50 and the adjustment member 41 of the knee bolster panel 40 may be disposed more stably.

A first coupling block 81, to which an upper mounting portion of a steering column is coupled, may be mounted to be adjustable in position on the first cross member 51. A plurality of mounting apertures 58 may be spaced apart from each other at a predetermined interval on the main pipe 51*a* of the first cross member 51, and the first coupling block 81 may be mounted to be adjustable in position on the main pipe 51*a* of the first cross member 51 through a plurality of mounting apertures 68. The second cross member 52 may have a structure with a specified length, and both end portions of the second cross member 52 may be configured to be connected to the pair of adjustment members 55. Since a mounting plate 57 may be coupled to each of the adjustment members 55 through welding, or the like, a pair of mounting plates 57 may be disposed on both sides of the second cross member 52.

The mounting plate 57 may include a plurality of mounting apertures 91 having a predetermined pattern, and since the position of both ends of the second cross member 52 may be mounted to be adjustable on the mounting plate 57 through the plurality of mounting apertures 91, the position of the second cross member 52 may be mounted to be adjusted in a forward/backward direction and/or in a vertical direction. A second coupling block 82, to which the lower mounting portion of the steering column is coupled, may be mounted to be adjustable in position on the second cross member 52. A plurality of mounting apertures 69 may be spaced apart from one another at a predetermined interval on the second cross member 52, and the second coupling block 82 may be mounted to be adjustable in position on the second cross member 52 through the plurality of mounting apertures 69.

FIGS. 5 through 8 are views illustrating a cowl cross 50 according to another exemplary embodiment of the present disclosure. According to another exemplary embodiment, the cowl cross 50 may include a first cross member 51 and a second cross member 52 disposed to be spaced apart from the first cross member 51.

The first cross member 51 may be configured to be extendible and contractible in length. Accordingly, the first cross member 51 may include a first main pipe 51*a* and a pair of first auxiliary pipes 51*b* movable from both ends of the first main pipe 51*a* in a length direction. Since the first auxiliary pipes 51*b* may be moved individually to be guided into or guided out from both ends of the first main pipe 51*a*, the first cross member 51 may be extendible and contractible in length. A first connection block 53 may be individually connected to each of the first auxiliary pipes 51*b*, and thus, a pair of first connection blocks 53 may be disposed at both ends of the first cross member 51. The first connection blocks 53 may be mounted to be adjustable in position at both left and right ends thereof by a pair of first adjustment members 55 symmetrically disposed at both left and right sides of the cowl cross 50.

Figure 6:
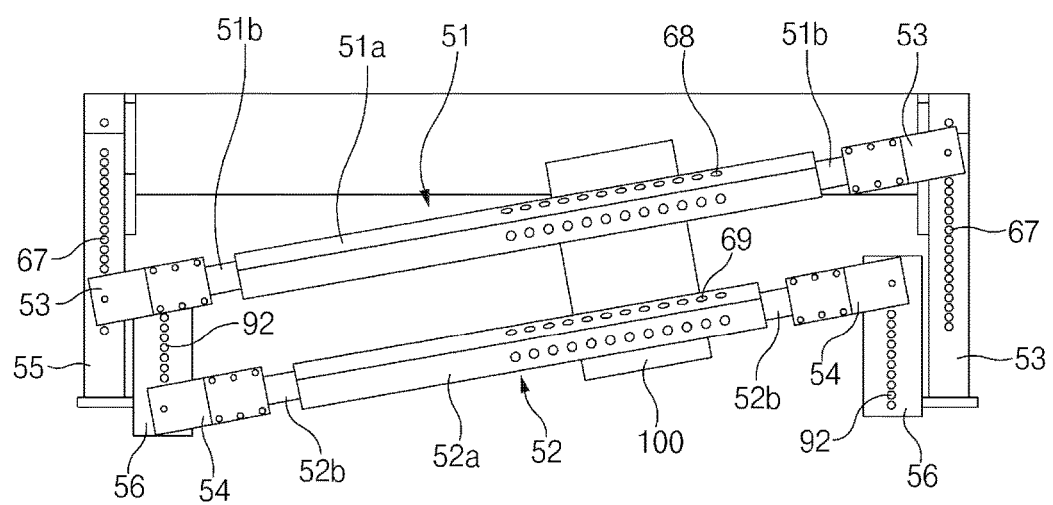
FIG. 6 is a plan view illustrating a position adjusted state of the cowl cross assembly of FIG. 5 according to an exemplary embodiment of the present disclosure.

A plurality of mounting apertures 67 may be spaced apart from each other at a predetermined interval on each of the first adjustment members 55, and the first connection block 53 may be mounted to be adjustable in position on the first adjustment member 55 through the plurality of mounting apertures 67. Accordingly, since the position of both ends of the first cross member 51 may be adjusted independently, the first cross member 51 may be adjusted to be sloped when viewed from above, as illustrated in FIG. 6. Additionally, the connector 55*a* may be disposed on one side of each of the first adjustment members 55. The connector 55*a* may be coupled to the first pillar 11 through welding, or the like, and the adjustment member 41 of the knee bolster panel 40 may be coupled to the first adjustment member 55 through welding, or the like. Thus, since the connector 55*a* may be welded to the first pillar 11, the first adjustment member 55 of the cowl cross 50 and the adjustment member 41 of the knee bolster panel 40 may be disposed more stably.

The second cross member 52 may be configured to be extendible and contractible in length. Accordingly, the second cross member 52 may include a second main pipe 52a and a pair of second auxiliary pipes 52b movable from both ends of second main pipe 52a in a length direction. Since the second auxiliary pipes 52b may be moved individually to be guided into or guided out from both ends of the second main pipe 52a, the second cross member 52 may be extendible and contractible in length. A second connection block 54 may be individually connected to each of the second auxiliary pipes 52b, and thus, a pair of second connection blocks 54 may be disposed at both ends of the second cross member 52. Further, the position of the pair of second connection blocks 54 may be adjusted independently at both left and right ends by a pair of the second adjustment members 56, the pair of second adjustment members 56 may be symmetrically disposed on both left and right sides of the cowl cross 50, and the second adjustment member 56 may be individually coupled to the first adjustment member 5.

Furthermore, a plurality of mounting apertures 92 may be spaced apart from each other at a predetermined interval on each of the second adjustment members 56, and the second connection block 54 may be mounted to be adjustable in position on the second adjustment member 56 through the plurality of mounting apertures 92. Accordingly, since the position of both ends of the second cross member 52 may be adjusted independently, the second cross member 52 may be adjusted to be sloped when viewed from plane, as illustrated in FIG. 6. In an exemplary embodiment of the present disclosure, when the first cross member 51 and/or the second cross member 52 are adjusted to be tilted when viewed from above, deformation of the cowl cross may be effectively replicated.

A coupling plate 100, to which the upper mounting portion and the lower mounting portion of the steering column are coupled, may be mounted to be adjustable in position on the first cross member 51. The plurality of mounting apertures 68 may be spaced apart from each other at a predetermined interval on the first main pipe 51a of the first cross member 51, and the plurality of mounting apertures 69 may be spaced apart from each other at a predetermined interval on the second main pipe 52a of the second cross member 52. For example, the main pipes 51a and 52a of the first and second cross members 51 and 52 may be provided as quadrangular pipes and may include the plurality of mounting apertures 68 and 69 disposed on each of the surface thereof, respectively. Through the plurality of mounting apertures 68 and 69, the coupling plate 100 may be mounted to be adjustable in position on the first and second main pipes 51a and 52a of the first and second cross members 51 and 52, respectively.

Figure 7:
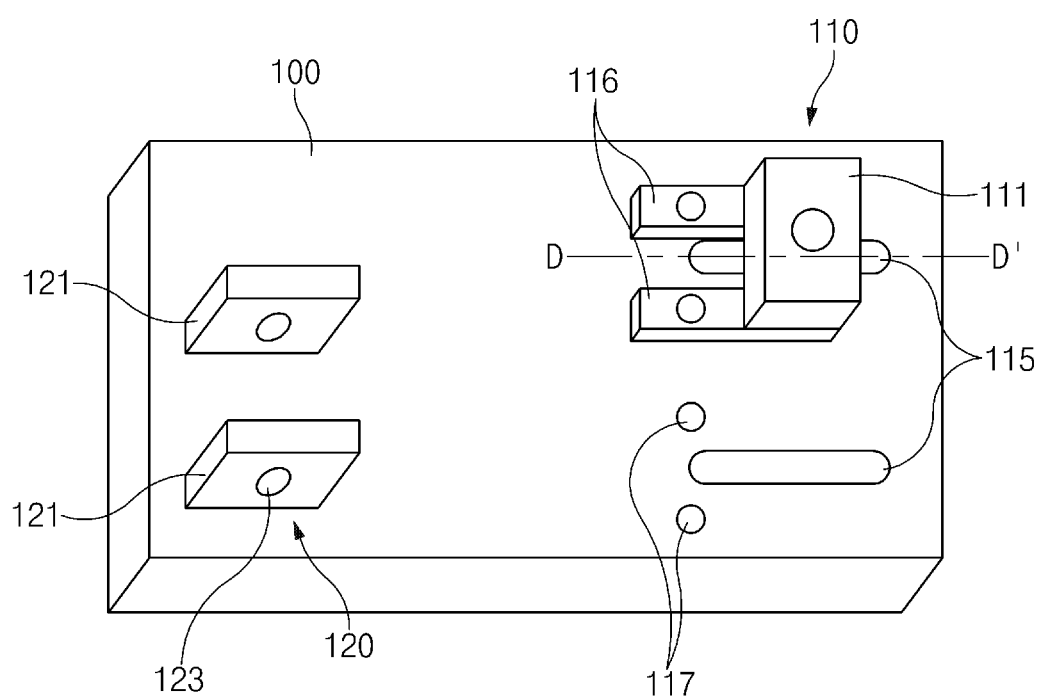
FIG. 7 is a perspective view illustrating a steering column mounting part of FIGS. 5 and 6 according to an exemplary embodiment of the present disclosure.

As illustrated in FIG. 7, the coupling plate 100 may include a first coupler 110 to which an upper mounting portion of the steering column may be coupled and a second coupler 120 to which a lower mounting portion of the steering column may be coupled. The first coupler 110 may include a pair of slots 115 spaced from each other on a first side or portion of the coupling plate 100 and a pair of first mounting blocks 111 mounted to be individually adjustable in position on the pair of slots 115.

Figure 8:
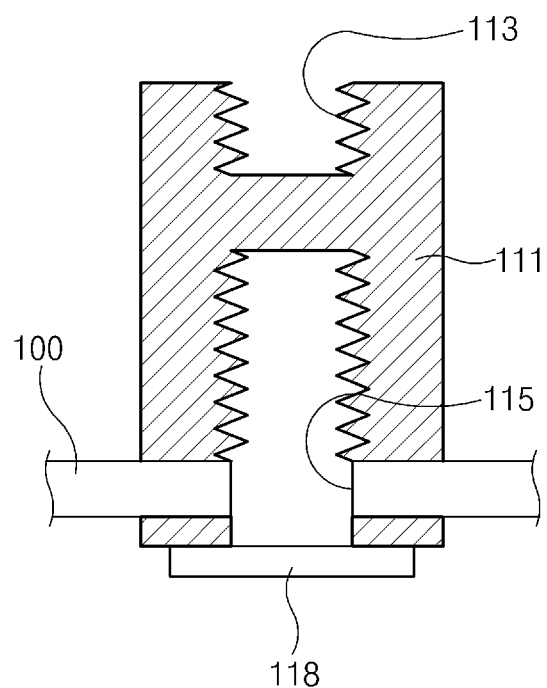
FIG. 8 is a cross-sectional view taken along line D-D of FIG. 7 according to an exemplary embodiment of the present disclosure.

As illustrated in FIG. 8, the first mounting block 111 may be fastened to the slot 115 by a fastener 118, and a mounting aperture 113 may be disposed on an upper portion of the first mounting block 111 to allow the upper mounting portion of the steering column to be mounted thereon. In particular, since the pair of first mounting blocks 111 may be mounted to be adjustable in position along the slots 115, a distance between the first coupler 110 and the second coupler 120 may be adjusted, whereby steering columns of various specifications may be more easily mounted. A fastening aperture 117 may be disposed adjacent to the slot 115, and a stopper 116 configured to prevent movement of the first mounting block 111 may be coupled to the fastening aperture 117.

The second coupler 120 may include a pair of second mounting protrusions 121 spaced apart from each other in a width direction at a second portion of the coupling plate 100, and the pair of the second mounting protrusions 121 may each have a mounting aperture 123 allowing a lower mounting portion of the steering column to be mounted thereon. The lower mounting portion of the steering column may be more stably mounted on the second coupler 120 as long bolts are fastened through the mounting apertures 123 of the pair of second mounting protrusions 121.

As described above, according to an exemplary embodiment of the present disclosure, since various components such as the pillars 11, 12, and 13, the roof 20, the wind shield 30, the knee bolster panel 40, and the cowl cross may be mounted to be adjustable in position, a general-purpose structure fitting to various types of vehicles may be realized, whereby the buck may be positively utilized in a sled test for optimizing restraint devices and analyzing dummy behavior characteristics even in a stage of advanced engineering of vehicles. Additionally, according to an exemplary embodiment of the present disclosure, a general-purpose structure fitting to various types of vehicles may be realized by applying the structure in which a plurality of components may be mounted to be adjustable in position, whereby the buck may be positively utilized in a sled test for optimizing restraint devices and analyzing dummy behavior characteristics even in a stage of advanced engineering of vehicles.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A universal buck for a sled test, comprising:
   a support plate;
   a plurality of pillars mounted on the support plate;
   a roof mounted on at least some of the plurality of pillars; and
   a wind shield mounted between pillars disposed on a front side among the plurality of pillars and a front end of the roof,
   wherein the plurality of pillars, the roof, and the wind shield are mounted to be adjustable in position on the support plate, and
   wherein the support plate includes a plurality of support units disposed to be symmetrical on both left and right sides thereof, the plurality of support units are configured to slidably support the plurality of pillars, respectively, and the plurality of pillars are mounted to be adjustable in position on the plurality of support units, respectively.

2. The universal buck according to claim 1, wherein the plurality of support units each include a pair of support bars spaced apart from each other in a width direction of the support plate and a linear bearing disposed between the pair of support bars.

3. The universal buck according to claim 2, wherein the pair of support bars each include a plurality of mounting apertures spaced apart from each other at a predetermined interval, and each of the plurality of pillars is mounted to be adjustable in position on the pair of support bars of each of the plurality of support units through the plurality of mounting apertures of the support bar.

4. The universal buck according to claim 1, wherein the plurality of pillars includes:
a pair of first pillars installed on a front side of the support plate and disposed to be symmetrical laterally;
a pair of second pillars spaced apart from the pair of first pillars backwardly and disposed to be symmetrical laterally; and
a pair of third pillars spaced apart from the pair of second pillars backwardly and disposed to be symmetrical laterally.

5. The universal buck according to claim 1, further comprising:
a knee bolster panel mounted to be adjustable in position below the wind shield.

6. The universal buck according to claim 5, wherein the knee bolster panel is mounted to be adjustable in a tilt angle thereof by a pair of adjustment blocks and a pair of adjustment arms respectively connected to the pair of adjustment blocks.

7. The universal buck according to claim 6, wherein the pair of adjustment blocks are respectively connected to the pair of first pillars disposed below the wind shield, an upper end of the knee bolster panel is pivotably mounted at a first end of each of the pair of adjustment blocks, and an upper end of each of the pair of adjustment arms is mounted to be adjustable in position in a length direction of the pair of adjustment blocks and a lower end of each of the pair of adjustment arms is mounted to be adjustable in position in a length direction of the knee bolster panel.

8. The universal buck according to claim 7, wherein the pair of adjustment blocks each have a plurality of mounting apertures spaced apart from each other at a predetermined interval, and the knee bolster panel has a plurality of mounting apertures spaced apart from each other at a predetermined interval on opposing sides thereof.

9. A universal buck for a sled test, comprising:
a support plate;
a plurality of pillars mounted to be adjustable in position on the support plate;
a roof mounted to be adjustable in position on at least some of the plurality of pillars;
a wind shield mounted to be adjustable in position between pillars disposed on a front side among the plurality of pillars and a front end of the roof; and
a cowl cross mounted to be adjustable in position below the wind shield.

10. The universal buck according to claim 9, wherein the cowl cross includes a first cross member and a second cross member mounted to be spaced apart from the first cross member, and the first cross member is extendible and contractible in length.

11. The universal buck according to claim 10, wherein both end portions of the second cross member are connected to the pair of adjustment members, a pair of mounting plates are respectively coupled to the pair of adjustment members, and the pair of mounting plates have a plurality of mounting apertures having a pattern structure, and both ends of the second cross member are mounted to be adjustable in position on the pair of mounting plates through the plurality of mounting apertures of the pair of mounting plates, respectively.

12. The universal buck according to claim 10, wherein
a first coupling block to which an upper mounting portion of a steering column is coupled is mounted to be adjustable in position on the first cross member, and
a second coupling block to which a lower mounting portion of the steering column is coupled is mounted to be adjustable in position on the second cross member.

13. The universal buck according to claim 10, wherein the first cross member includes a main pipe and a pair of auxiliary pipes movable from both ends of the main pipe in a length direction.

14. The universal buck according to claim 13, wherein a pair of connection blocks are respectively connected to the pair of auxiliary pipes, and the pair of connection blocks are mounted to be adjustable in position respectively by a pair of adjustment members, and both ends of the first cross member are adjusted independently in position.

15. The universal buck according to claim 14, wherein the pair of adjustment members each have a plurality of mounting apertures spaced apart from each other at a predetermined interval, and the pair of connection blocks are mounted to be adjustable in position on the pair of adjustment members through the plurality of mounting apertures of the pair of adjustment members.

16. The universal buck according to claim 9, wherein
the cowl cross includes a first cross member and a second cross member mounted to be spaced apart from the first cross member, and
the first cross member and the second cross member is extendible and contractible in length.

17. The universal buck according to claim 16, wherein the first cross member includes a first main pipe and a pair of first auxiliary pipes movable from both ends of the first main pipe in a length direction.

18. The universal buck according to claim 17, wherein a pair of first connection blocks are respectively connected to the pair of first auxiliary pipes, and the pair of first connection blocks are respectively mounted to be adjustable in position by a pair of first adjustment members, and both ends of the first cross member are independently adjusted in position.

19. The universal buck according to claim 18, wherein the pair of first adjustment members includes a plurality of mounting apertures spaced apart from each other at a predetermined interval, and the pair of first connection blocks are mounted to be adjustable in position on the pair of first adjustment members through the plurality of mounting apertures of the pair of first adjustment members.

20. The universal buck according to claim 16, wherein the second cross member includes a second main pipe and a pair of second auxiliary pipes movable from both ends of the second main pipe in a length direction.

21. The universal buck according to claim 20, wherein a pair of second connection blocks are respectively connected to the pair of second auxiliary pipes, and the pair of second connection blocks are respectively mounted to be adjustable in position by a pair of second adjustment members, and both ends of the second cross member are adjusted independently in position.

22. The universal buck according to claim 21, wherein the pair of second adjustment members include a plurality of mounting apertures spaced apart from each other at a predetermined interval, and the pair of second connection blocks are mounted to be adjustable in position on the pair of second adjustment members through the plurality of mounting apertures of the pair of second adjustment members.

23. The universal buck according to claim 16, wherein a coupling plate to which the upper mounting portion and the lower mounting portion of a steering column are coupled is mounted to be adjustable in position on the first cross member and the second cross member, and the coupling plate is mounted across the first cross member and the second cross member.

24. The universal buck according to claim 23, wherein the coupling plate includes a first coupler to which the upper mounting portion of the steering column is coupled and a second coupler to which the lower mounting portion of the steering column is coupled.

25. The universal buck according to claim 24, wherein
the first coupler includes a pair of slots disposed on a first portion of the coupling plate and a pair of first mounting blocks mounted to be respectively adjusted in position in the pair of slots, and
the pair of first mounting blocks each include a mounting aperture in which the upper mounting portion of the steering column is mounted.

26. The universal buck according to claim 25, wherein a fastening aperture is disposed adjacent to the pair of slots, and a stopper configured to prevent movement of the pair of first mounting blocks is coupled to the fastening aperture.

27. The universal buck according to claim 24, wherein the second coupler includes a pair of second mounting protrusions disposed on a second portion of the coupling plate, and a mounting aperture allowing the lower mounting portion of the steering column to be mounted thereon is disposed on each of the pair of second mounting protrusions.

\* \* \* \* \*